(12) United States Patent
Ahern

(10) Patent No.: US 12,022,799 B2
(45) Date of Patent: Jul. 2, 2024

(54) PET BED WITH REMOVABLE WARMING OR COOLING UNIT

(71) Applicant: Terry Ahern, Columbus, GA (US)

(72) Inventor: Terry Ahern, Columbus, GA (US)

( * ) Notice: Subject to any disclaimer, the term of this patent is extended or adjusted under 35 U.S.C. 154(b) by 183 days.

(21) Appl. No.: 17/788,600

(22) PCT Filed: Dec. 23, 2020

(86) PCT No.: PCT/US2020/066830
§ 371 (c)(1),
(2) Date: Jun. 23, 2022

(87) PCT Pub. No.: WO2021/133906
PCT Pub. Date: Jul. 1, 2021

(65) Prior Publication Data
US 2023/0029675 A1 Feb. 2, 2023

Related U.S. Application Data

(60) Provisional application No. 62/953,040, filed on Dec. 23, 2019.

(51) Int. Cl.
*A01K 1/035* (2006.01)
*A47C 21/04* (2006.01)
(Continued)

(52) U.S. Cl.
CPC ............ *A01K 1/0353* (2013.01); *A47C 21/04* (2013.01); *A47C 27/001* (2013.01); *A47C 27/005* (2013.01); *A47C 27/15* (2013.01)

(58) Field of Classification Search
CPC .... A01K 1/0353; A47C 21/04; A47C 27/001; A47C 27/005; A47C 27/15; A47C 20/025;
(Continued)

(56) References Cited

U.S. PATENT DOCUMENTS

| 5,226,384 A | 7/1993 | Jordan |
| 7,530,326 B2 | 5/2009 | Dunn et al. |

(Continued)

FOREIGN PATENT DOCUMENTS

KR  100678989 B1  2/2007

OTHER PUBLICATIONS

International Preliminary Report on Patentability for PCT/US2020/066830 dated Jun. 28, 2022.

*Primary Examiner* — Joshua J Michener
*Assistant Examiner* — Henry Hooper Mudd
(74) *Attorney, Agent, or Firm* — Browdy and Neimark, PLLC

(57) ABSTRACT

A pet bed including a base mattress including a cut-out is defined in a first layer, and a corresponding detent is defined in a second layer, and a water repellant outer covering surrounds the first layer and the second layer, and includes a water resistant section sewn into the water repellant outer covering which consists only of a portion of a surface of the water repellant outer covering corresponding to the cut-out, and a top coverlet configured to be removably connected to the base mattress to cover a top surface of the base mattress. The water resistant section of the water repellant outer covering is sized and positioned so as to extend into the cut-out and detent when the water repellant outer covering is in use and a heating or cooling unit is seated on the water resistant section to be flush with a top surface of the water repellant outer covering.

22 Claims, 8 Drawing Sheets

(51) Int. Cl.
*A47C 27/00* (2006.01)
*A47C 27/15* (2006.01)

(58) Field of Classification Search
CPC . A47C 27/144; A47C 27/146; A47C 27/1425; A47C 27/421
See application file for complete search history.

(56) References Cited

U.S. PATENT DOCUMENTS

| | | |
|---|---|---|
| 7,614,362 B2 | 11/2009 | Dunn |
| 8,342,126 B2 | 1/2013 | Simon et al. |
| 8,689,375 B2 | 4/2014 | Stitchcomb |
| 2006/0272581 A1 | 12/2006 | Dunn et al. |
| 2008/0173627 A1 | 7/2008 | Martin et al. |
| 2011/0197822 A1 | 8/2011 | Chou et al. |
| 2013/0247828 A1 | 9/2013 | Tedadli et al. |
| 2016/0106061 A1 | 4/2016 | Nelson |
| 2016/0192617 A1 | 7/2016 | Murphy |
| 2016/0309678 A1 | 10/2016 | Garnet |
| 2017/0251630 A1 | 9/2017 | Johnson-Hovey et al. |
| 2019/0021277 A1 | 1/2019 | Godfrey |

PET BED WITH REMOVABLE WARMING OR COOLING UNIT

FIELD

The present invention relates to pet beds, and particularly to a pet bed with a removable warming or cooling unit.

BACKGROUND

There are many pet beds on the market. Often, many of them offer no means of removal of outer upholstered covering for cleaning resulting in cumulative dirt and pet odors; others that do allow for cover removal must be peeled off and laundered and wrestled back into casing and zipped closed. Not only is the casing difficult to remove, but the stuffing or foam filling deteriorates with each removal. There are others that are essentially ruined by water spillage or soiling that bear no other alternative but to be thrown away. There are pet beds that come with a waterproof exterior; however, there is much to be desired in the way of comfort and aesthetics. Some pet beds present with electrical cords and heating sources which have proved deleterious to the pet; overheating, maceration of electrical cords, or entanglement can result in severe thermal burns or systemic injury, death of a pet, and/or fire.

SUMMARY

An objective of this invention is to promote an alternative pet bed that allows for good husbandry practices, offering a durable and waterproof base mattress with the option to provide warmth or cooling, as well as support for a sleeping pet's draping head. Overlying coverlets, which attach to the base mattress, can be easily removed and exchanged for another according to need and season. Versatility in use is provided through an assortment of aesthetically pleasing coverlets offered in coordinating colors, fabric types, and designs.

Two features that set this invention apart from the others is a durable waterproof base mattress comprising a defined water-resistant recess within its upper surface wherein a warm water bottle, hydrocollator, cooling pack or any other warming or cooling unit resides and is covered out of view. Warm water bottles serve several purposes for all ages and all breeds. Devoid of electrical cords, it eliminates the potential for electricity and subsequent thermal injury, electrocution, fires and/or death. Furthermore, a warming device such as a warm water bottle, rice pack, or hydrocollator provide warmth without the threat of overheating the pet, providing comfort and a gentle source of warmth to the young, elderly, infirmed, anxious or nervous, damp or just plain cold pet needing warmth.

In addition, the base mattress also offers a slant at the surface periphery. Quite often, pets will recline as their head carelessly drapes over the side with their head hanging in the abyss; the built-in slant provides support to the head in neck in this natural sleeping posture that many pets assume.

Whereas the base mattress remains stationary without need for laundering, overlying coverlets are designed to have a waterproof barrier between the pet and the base mattress. Coverlets are washable, interchangeable, and may be reversible. Removal of a coverlet is simple and can be swapped for another according to need or season. Coverlets may be representative of a holiday or team, displaying a team's colors and/or logo. Combined with the potential for built in warmth, a terry cloth coverlet, for example, would serve to both dry and warm a pet following a bath. A coverlet made of fleece and warmth from an underlying hydrocollator would provide 'moist heat' to a pet suffering from skeletomuscular pain such as an arthritic pet. The assembly using a warm water bottle would provide warmth and comfort to pets who suffer from anxiety during inclement weather, separation anxiety, and young or elderly pets requiring supportive care. Alternatively, a lightweight coverlet having a cooling source beneath would be a welcomed reprieve by any pet during the heat of summer.

Thus, there is need for a pet bed that offsets unfavorable issues of current pet beds marketed today. This invention takes a new conceptual approach for a pet bed assembly which includes the built-in provision to either safely warm or cool a pet; ease of removal and reattachment of a top coverlet; a durable base mattress which reserves the potential to last; and support for a pet's head reclined in a downward slope. With this pet bed, pet owners have options which serve to accommodate their pet without much to do to maintain cleanliness and comfort.

According to one configuration, a pet bed includes a base mattress including at least a first layer and a second layer, and a water repellant outer covering, wherein a cut-out is defined in the first layer, and a detent is defined in the second layer, the detent having a position and shape corresponding to a position and shape of the cut-out, and wherein the water repellant outer covering surrounds the first layer and the second layer, and comprises a water resistant section sewn into the water repellant outer covering, wherein the water resistant section consists only of a portion of a surface of the water repellant outer covering having a position and shape corresponding to the position and shape of the cut-out, and a top coverlet configured to be removably connected to the base mattress to cover a top surface of the base mattress, wherein the water resistant section of the water repellant outer covering is sized and positioned so as to extend into the cut-out defined in the first layer and the detent defined in the second layer when the water repellant outer covering is in use and a warming or cooling unit is seated on the water resistant section, such that a top surface of the warming or cooling unit is flush with a top surface of the water repellant outer covering.

According to one configuration, the base mattress comprises a third layer, the base mattress comprising the second layer disposed on the third layer, and the first layer surrounding the second and third layers.

According to one configuration, the pet bed further includes a strap arrangement disposed on an outer surface of each of two sides of the water repellant outer covering.

According to one configuration, the top coverlet includes a center portion comprising a first fabric having a first surface and a second waterproof surface opposite to the first surface, the second surface configured to contact the water repellant outer covering when in use, at least two flaps, each connected to a side of the center portion and configured to hang over the water repellant outer covering, each flap having a first surface and a second surface opposite to the first surface.

According to one configuration, handles are provided on the first and second surfaces of at least two of the flaps disposed so as to engage with the strap arrangement.

According to one configuration, the third layer comprises a relatively stiff foam cushion.

According to one configuration, the second layer comprises a foam cushion, wherein the second layer is shorter in width on two first opposing sides and equal in width on two second opposing sides than the third layer so as to create a ridge along the base mattress on which a pet can rest its head.

According to one configuration, the first layer comprises a batting material sized to completely enclose the second layer and the third layer on four sides.

According to one configuration, the first layer is wrapped around the third layer and has a slanted portion extending between the second layer and the third layer on the two first opposing sides to provide support for the pet's head.

According to one configuration, the water resistant section comprises a material different from a material used to make the water repellant outer covering.

According to one configuration, in which the top coverlet is reversible, the center portion of the top coverlet includes a top layer comprising a first material having a first aesthetically pleasing design, a middle waterproof interface layer, and a bottom layer comprising a second material having a second aesthetically pleasing design.

According to one configuration, the top coverlet is quilted.

According to one configuration, the first aesthetically pleasing material is different than the second aesthetically pleasing material.

According to one configuration, the top coverlet is interchangeable with other top coverlets having different materials forming the top and bottom layers.

According to one configuration, the top coverlet is interchangeable with other top coverlets having different patterns on the four flaps.

According to one configuration, each of the strap arrangements comprise a strap having a first free end, an intermediate portion, and a second end affixed to a side surface of the outer covering, and a pair of rings affixed to a top surface of the outer covering, the rings in each pair being disposed near to one another, wherein the free end of each strap is configured to be inserted into both rings of the pair of rings, then inserted through a respective one of the handles on the top coverlet, folded over the one of the rings in the pair, and through a second one of the rings in the pair, and wherein the free end of each strap comprises a first fastener element, a second fastener element is connected to the second end of each strap, and the first fastener element and the second fastener element are configured to engage with one another to secure the top coverlet to the base mattress.

According to one configuration, in which the top coverlet is nonreversible, it comprises a first layer comprising a decorative coordinating fabric and a second layer connected to the first layer comprising a waterproof interfacing layer.

According to one configuration, a kit includes a pet bed including a base mattress including at least a first layer and a second layer, and a water repellant outer covering, wherein a cut-out is defined in the first layer, and a detent is defined in the second layer, the detent having a position and shape corresponding to a position and shape of the cut-out, and wherein the water repellant outer covering surrounds the first layer and the second layer, and comprises a water resistant section sewn into the water repellant outer covering, wherein the water resistant section consists only of a portion of a surface of the water repellant outer covering having a position and shape corresponding to the position and shape of the cut-out, and a top coverlet configured to be removably connected to the base mattress to cover a top surface of the base mattress, wherein the water resistant section of the water repellant outer covering is sized and positioned so as to extend into the cut-out defined in the first and second layers when the water repellant outer covering is in use and a warming or cooling unit is seated on the water resistant section, such that a top surface of the warming or cooling unit is flush with a top surface of the water repellant outer covering, at least one warming or cooling unit, and one or more additional top coverlets having at least one of center portions of different materials and flaps having similar or different patterns.

According to one configuration, a method of making a pet bed includes cutting a first foam cushion into a predetermined shape having a predetermined thickness, cutting a second foam cushion into the predetermined shape having a predetermined thickness that is thinner than the predetermined thickness of the first foam cushion, and two first opposing sides that are shorter in width than a width of the first foam cushion, placing the second foam cushion on the first foam cushion, cutting a width and length of batting material of a sufficient size to completely enclose the first and second foam cushions, cutting a cut-out in the batting material and a detent in the second foam cushion, the detent having a size and position corresponding to a size and position of the cut-out, covering the first and second foam cushions with the cut batting material to form a base mattress insert, such that when the first and second foam cushions are covered with the batting material, the batting material slants between a top of the second foam cushion and a side of the first foam cushion at the first two opposing sides, making a water repellant outer cover of a water-resistant material that is shaped and sized to cover the base mattress insert, connecting a strap arrangement on an outer surface of two sides of the water repellant outer covering, cutting a hole in the water repellant outer cover, connecting a piece of water resistant material directly to the water repellant outer cover, the piece of water resistant material being sized to be slack in the water repellant outer cover, covering the base mattress insert with a water repellant outer cover such that the piece of water resistant material is positioned to cover and extend into the recess when a warming or cooling unit is seated on the piece of water resistant material.

According to one configuration, the method includes forming a top coverlet by cutting a piece of a first fabric having a first aesthetically pleasing design, cutting a piece of a waterproof interface layer to the same size as the piece of the first fabric, cutting a piece of a second fabric having a second aesthetically pleasing design, connecting the piece of the first fabric, the piece of the waterproof interface layer, and the piece of the second fabric as three layers, respectively to form a center portion of the top coverlet, connecting two or more flaps to the center portion, one flap on each side of the center portion, wherein the two or more flaps comprise a third fabric having a third aesthetically pleasing design, and connecting a handle on each surface of each surface of the two or more flaps.

According to one configuration, the method further includes connecting two pairs of rings to the outer cover in close proximity to each other, one pair on each side of the outer cover in a position such that a free end of respective first straps can be inserted through the rings, wherein a ring is inserted on each of the first straps, a first fastener element is connected on a first end of the first straps, and a second fastener element is connected to a second end of the first straps, and wherein the first fastener element and the second fastener element are configured to engage with one another to secure the top coverlet to the base mattress.

According to one configuration, a pet bed includes a base mattress including a base layer comprising a foam cushion, an intermediate layer juxtaposed on the base layer, a batting layer enclosing the base layer and the intermediate layer, a cut-out defined in the batting layer passing through an entire thickness of the batting layer, a detent defined in the intermediate layer extending partway into intermediate layer, the detent having a position and shape corresponding to a position and shape of the cut-out, a water repellant outer covering surrounding the base layer, the intermediate layer and the batting layer, the water repellant outer covering comprising a water-resistant section sewn into the water repellant outer covering, wherein the water-resistant section consists only of a portion of a surface of the water repellant outer covering having a position and shape corresponding to the position and shape of the cut-out, a strap arrangement disposed on an outer surface of each of two sides of the water repellant outer covering, and a top coverlet including a center portion comprising a first fabric having a first surface and a second surface opposite to the first surface, the second surface configured to contact the water repellant outer covering when in use, at least two flaps, each connected to a side of the center portion and configured to hang over the water repellant outer covering, each flap having a first surface and a second surface opposite to the first surface, and handles on the first and second surfaces of at least two of the flaps disposed so as to engage with the strap arrangement, wherein the water resistant section of the water repellant outer covering is sized and positioned so as to extend into the cut-out defined in the batting layer and the interfacing layer when the water repellant outer covering is in use and a warming or cooling unit is seated on the water resistant section, such that a top surface of the warming or cooling unit is flush with a top surface of the water repellant outer covering.

BRIEF DESCRIPTION OF THE DRAWINGS

For better understanding of the invention and additional objects and advantages thereof, reference is made to the following detailed description and accompanying drawing of a preferred embodiment, wherein.

DETAILED DESCRIPTION

Figure 1:
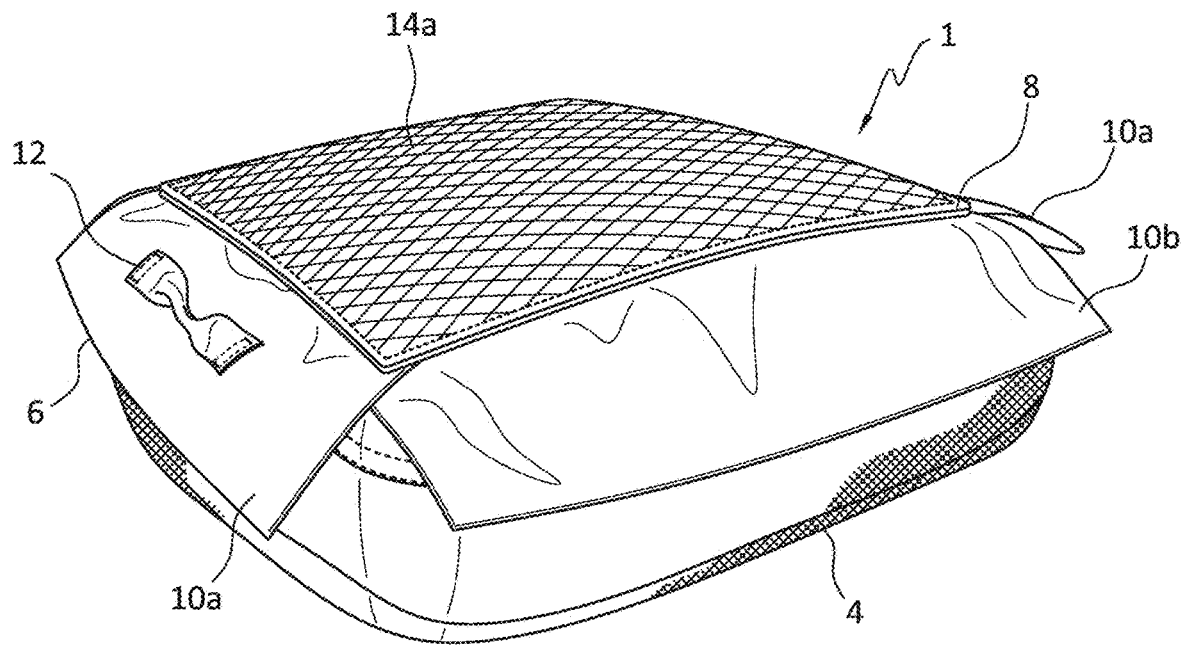
FIG. 1 is a perspective view of a pet bed according to one configuration.
Figure 2:
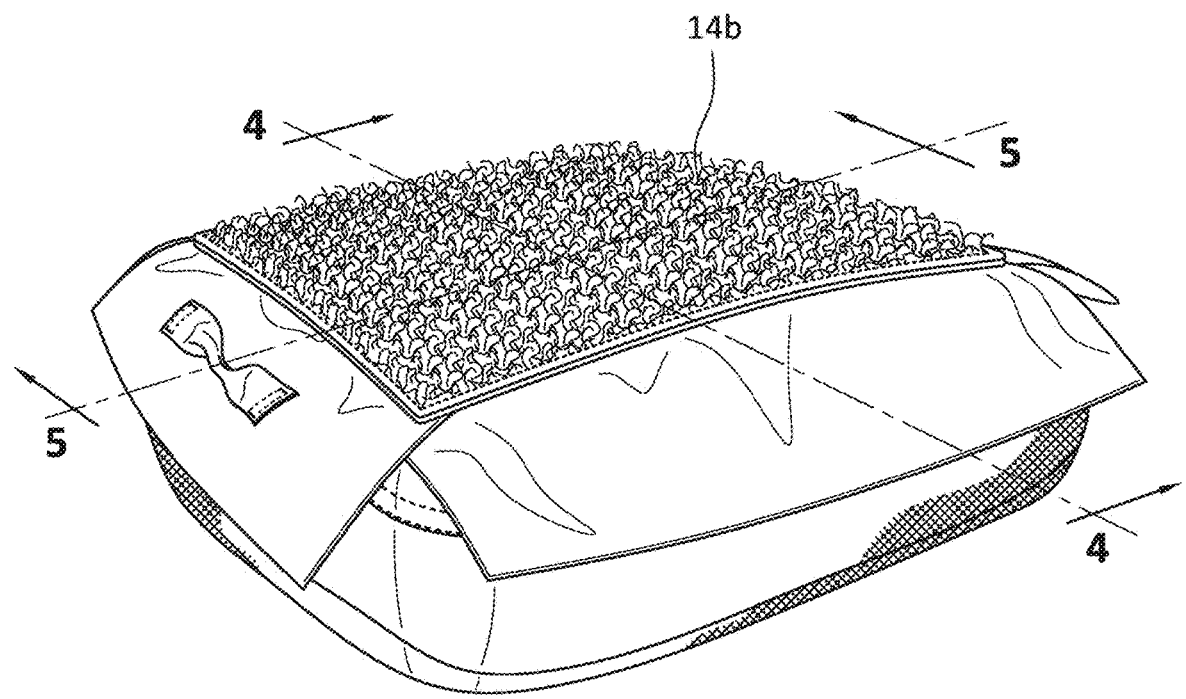
FIG. 2 is a perspective view of the pet bed of FIG. 1.

FIG. 1 is a perspective view of a pet bed 1 according to a first embodiment of the disclosed subject matter. According to this first embodiment, the pet bed 1 is shaped as a square, but other shapes are possible, including but not limited to rectangles, and the round shape described with respect to FIGS. 6-8. The pet bed 1 includes a base mattress 4 and a top coverlet 6. The top coverlet 6 includes a central pad 8 surrounded by four side flaps. Two opposing side flaps 10a are sewn or otherwise connected at two opposing sides of the central pad 8. Two more side flaps 10b are disposed and connected to the central pad 8 at the sides adjacent to the two opposing side flaps 10a. Alternatively, two of the flaps 10a may be replaced by extensions of the material of the central pad 8 (not shown), so that the top coverlet is formed by one long center piece and two flaps extending from a central portion of that center piece in opposing directions away from the center piece. Alternatively, the top coverlet may be formed by a single piece of layered fabric 6' which drapes over base mattress 4. This single piece top coverlet is illustrated with respect to the exemplary embodiment shown in FIGS. 6-8, though it is understood that the top coverlet 6 may be constructed in this way with respect to the embodiment of FIGS. 1-5.

Figure 3:
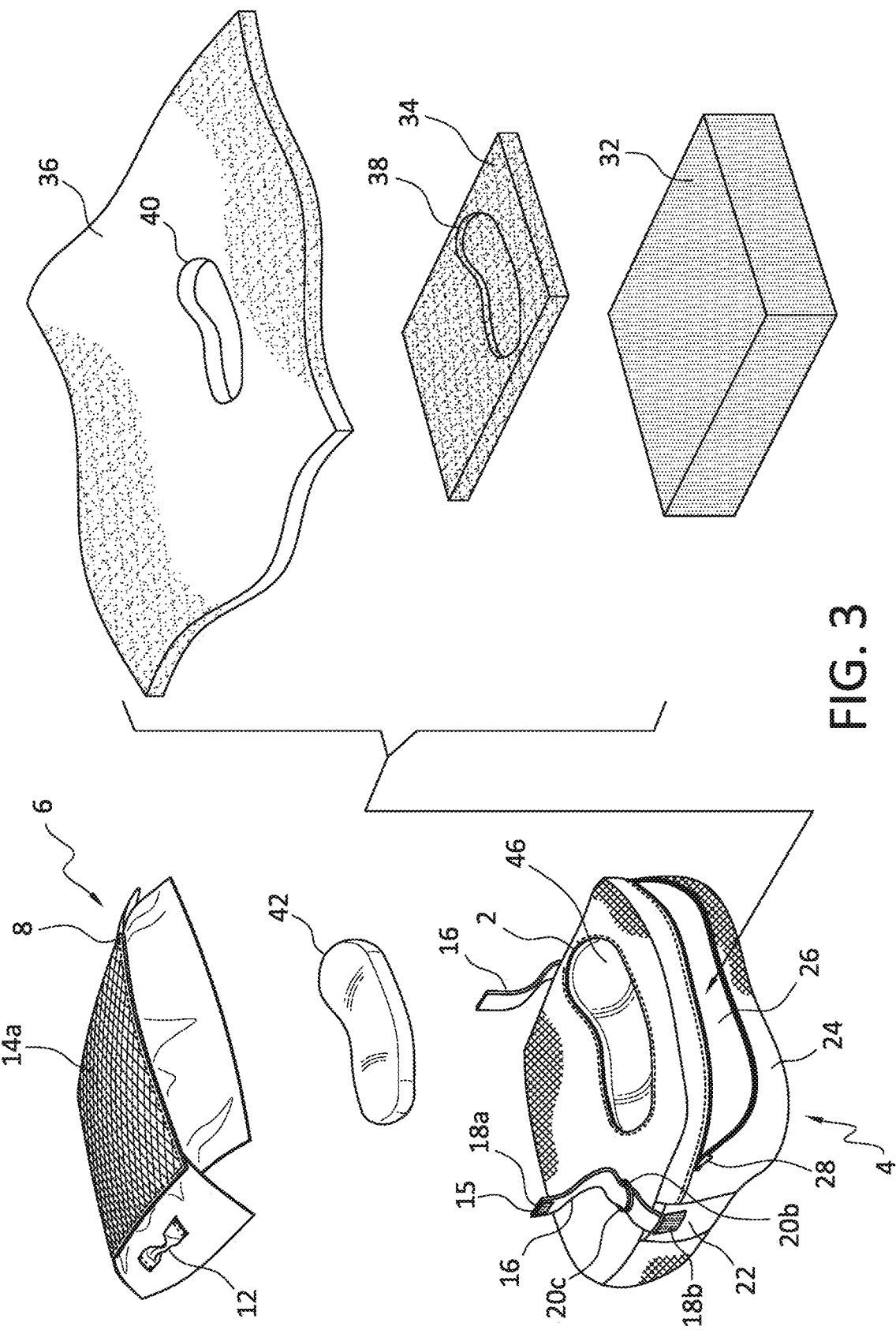
FIG. 3 is an exploded view of the pet bed of FIG. 1.
Figure 5:
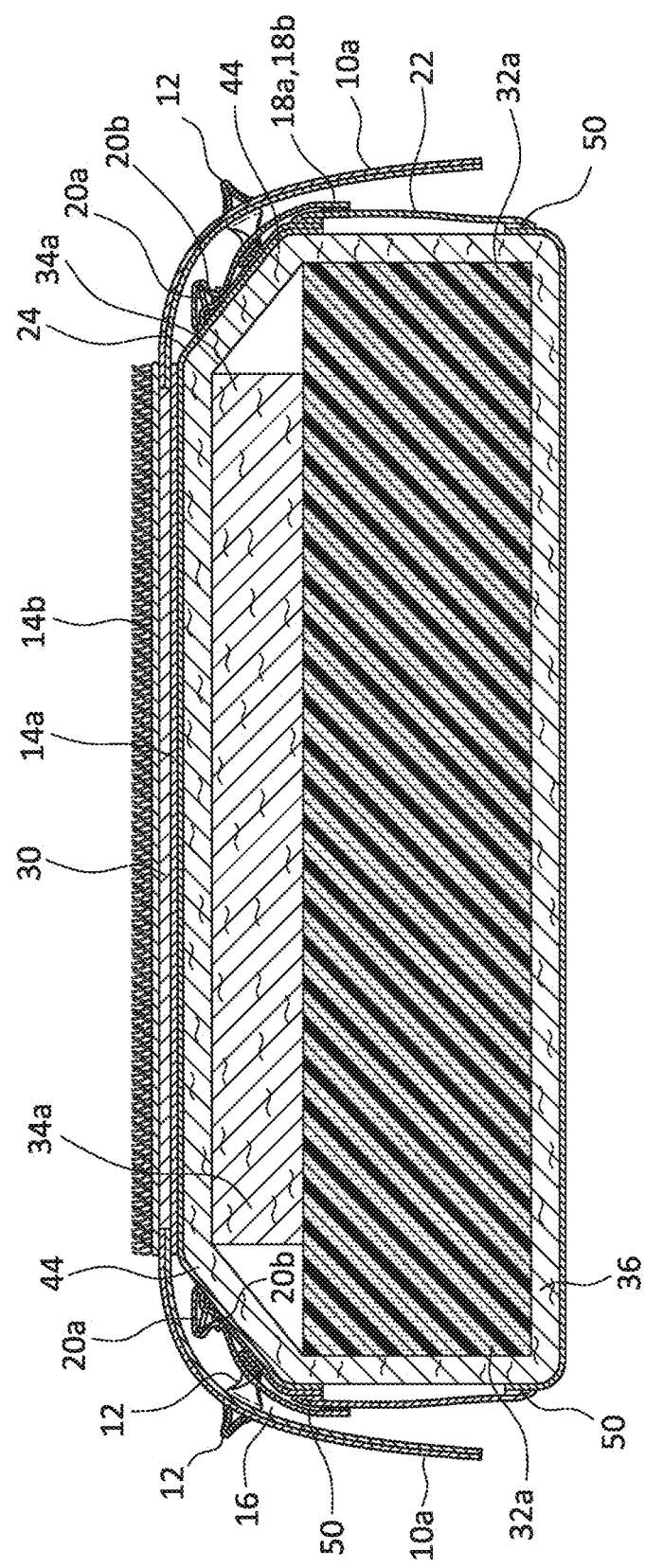
FIG. 5 is a cross-section view of the pet bed of FIG. 1 along the line 5-5.

The top coverlet 6 may be removably connected to the base mattress 4 by interconnecting handles and straps according to the following arrangement. Handles 12 are provided on opposing flaps 10a of the top coverlet 6 on both surfaces as shown in FIG. 5. A strap arrangement 15 is provided on two sides of an outer cover 24 of the base mattress 4 in locations corresponding to the locations of the handles 12. The strap arrangement 15 includes straps 16, each strap 16 having a hook area 18a on a free end (see FIG. 3). A portion of the other end of the straps 16 (not shown) is sewn onto or otherwise affixed to the outer cover 24 and a small patch 22 can be sewn or otherwise affixed to the outer surface of the outer cover 24 to cover the portion of the straps 16 that is sewn to the outer cover 24. The loop area 18b is sewn or otherwise affixed to the patch 22 at a predetermined location. The patch 22 can be made of the same material as the outer cover 24, or another suitable material. Two pairs of rings 20a, 20b are fixed to the outer cover 24 near each other, one on each side of the outer cover 24 (only one pair is shown in FIG. 3, but both pairs are shown in FIG. 5).

In the place of straps, snaps, buckles, or other fasteners could be used to attach the top coverlet 6 to the base mattress 4.

When the top coverlet 6 is to be connected to the base mattress 4, the straps 16 can be inserted through both rings 20a, 20b in each pair. The free end of each of the straps 16 can then be inserted through the handles 12 on the underside of the top coverlet, that is, the side that is not being used as the top surface at that time. The free end of each of the straps 16 can then be folded over ring 20a and through ring 20b in each pair, i.e., between the two rings, and pulled tight. The hook area 18a on each strap is then engaged with the loop area 18b on each strap 16 to secure the top coverlet 6 to the base mattress 4. See FIG. 5.

Alternatively, the top coverlet can be formed without any handles or straps. Decorative ribbons or bows can be included as desired.

The top coverlet 6 is easily removeable, washable, and interchangeable and is meant to be available in an assortment of coordinating colors, fabrics, and textures suitable for any given season or holiday. For example, designs showing NFL logos, college logos and/or mascots, Christmas designs, Halloween designs, as well as other decorative designs, such as attachments, may be sold.

Figure 4:
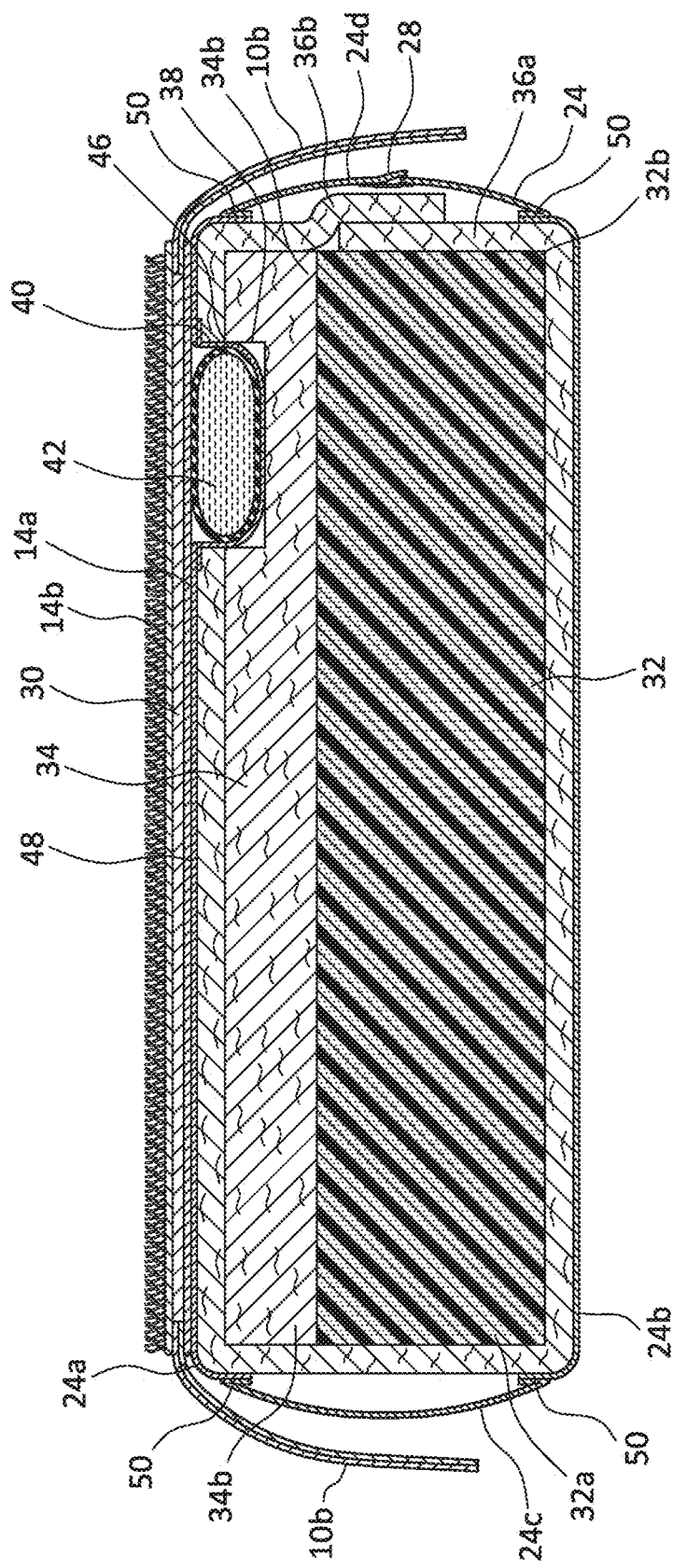
FIG. 4 is a cross-sectional view of the pet bed of FIG. 1 along the line 4-4.

The central pad 8 may include an aesthetically pleasing designed top fabric layer 14a, a middle waterproof interfacing 30 (FIGS. 4 and 5), and bottom coordinating fabric layer 14b. The top layer 14a and bottom layer 14b may be the same or different fabrics and may be quilted. An assortment of colors and textures suitable for any given season may be used for top layer 14*a* and bottom layer 14*b*. In the exemplary configuration shown in FIG. 1, the top layer 14*a* is shown as a quilted cotton blend fabric, such as cotton, velour, fleece, or other suitable washable material. In the exemplary configuration shown in FIG. 2, the bottom layer 14*b* is shown being made of a fleece material that is soft to the touch, and the side flaps 10*a* and 10*b* are made of duck cloth. Other suitable materials may be used. Further, the top coverlet 6 may be made waterproof by using a waterproof fabric for the middle interfacing 30 or bottom waterproof fabric layer of a non-reversible coverlet. The side flaps 10*a*, 10*b* as shown in FIGS. 4 and 5 are sewn to the central pad 8 between the top layer 14*a* and bottom layer 14*b*. The side flaps 10*a*, 10*b* may be formed from two layers of coordinating fabric sewn together. The side flaps 10*a*, 10*b* may be made of a waterproof fabric or any other suitable washable material, such as for example, duck cloth, cotton, cotton blend, velour, denim, water repellant cotton/polyester blend, 100% nylon, or 100% polyester.

As shown in FIGS. 3 and 4, the base mattress 4 may have an outer cover 24 that includes an opening 27 that can be closed by a zipper 28, so that the outer cover 24 is removable in the event it gets damaged or another color material is desired. Alternatively, the outer cover 24 may be sewn shut by the manufacturer (not shown), so that the outer cover 24 is not easily removable. The outer cover 24 may be made of a water repellant material, for example, ballistic nylon. As illustrated in FIGS. 4 and 5, seams 50 may be sewn at the top and bottom region of the outer cover 24 to connect top and bottom pieces 24*a*, 24*b* of material with strips 24*c*, 24*d* of material forming sides of the outer cover 24.

The base mattress insert 26 may include a base layer 32, an intermediate layer 34, and a batting layer 36. The base layer 32 may be constructed of a relatively stiff foam cushion or padding. In one configuration, the foam cushion of the base layer 32 may have a thickness from top to bottom of about 5". In one configuration, a thin, water-resistant liner can be provided enveloping the interior pieces, such as the base layer 32, the intermediate layer 34 and the batting layer 36. The intermediate layer 34 may be constructed of a polyester chair cushion, or other foam material that is relatively softer and more pliant than the foam used for the base layer 32. The intermediate layer 34 and the base layer 32 should preferably have the same general shape, e.g., rectangular in the configuration shown in FIG. 3. The intermediate layer 34 may have two opposing sides 34*a* that are shorter in width on two opposing sides 32*a* of the base layer 32 (see FIG. 5), whereas the other two opposing sides 34*b* of the intermediate layer 34 may be substantially equal in width to opposing sides 32*b* of the base layer 32 (FIG. 4). In one configuration, the two opposing sides 34*a* are about 4" shorter in width than the width of the two opposing sides 32*a* of the base layer 32. In one configuration, the cushion of the intermediate layer 34 may have a thickness from top to bottom of about 2". In the above description, the sizes of the various elements are provided as exemplary only; different sizes could be made for use by different sized pets, e.g., large dogs versus small dogs, or cats. The difference in the widths between the base layer 32 and the intermediate layer 34 creates a ridge 44 along the base mattress on which the pet can rest its head. Although shown in the figures as having a ridge 44 only on two sides of the pet bed, it is possible to construct the intermediate layer 34 to be sized so that it is smaller than the base layer 32 on all four sides, so that the ridge is formed around the entire pet bed.

The batting layer 36 is sized so as to be wrapped around and totally surround the base layer and the intermediate layer 34. In one configuration, the batting layer 36 is made of a polyester batting material, but can be made of other batting materials, such as cotton, wool, cotton/polyester blends, or bamboo. The batting layer 36 is used to provide cushioning and insulation between the intermediate layer 34 and the outer cover 24. The batting layer 36 also provides dimension, texture and loft to the base mattress 4 as well as providing an insulting layer of warmth. As shown in FIG. 4, the ends 36*a*, 36*b* of the batting layer 36 are layered on top of one another to encase the base layer 32 and the intermediate layer 34. The batting layer material essentially sticks together for easy sealing. As shown in FIG. 5, when the batting layer 36 is wrapped around the sides 32*a* and 34*a* of the base and intermediate layers 32, 34, respectively, a slanted region of the batting layer 36 is formed to cover the ridge 44. This slanted region allows the pet to lay with its head draped over the slanted side of the bed, and still get support for its head and neck.

As shown in FIGS. 3 and 4, a cut-out 40 is defined in the batting layer 36, and extends through the entire thickness of the batting layer 36 to form an opening therein. Additionally, a detent 38 is cut in the intermediate layer 34 but it does not go all the way through the intermediate layer 34. The size and position of the detent 38 corresponds to the size and position of the cut-out 40. Further, it is possible to provide a removable insert in the cut-out 40 that can be used to fill in the detent 38 when the warming/cooling unit is not in use.

The outer cover 24 may be made of a nylon mesh fabric or a ballistic nylon fabric. The fabric is preferably waterproof or water repellant. A hole 2 is defined in the outer cover 24 in a position, shape and size corresponding to the position, shape and size of the cut-out 40 and detent 38. A piece of non-mesh nylon waterproof material 46 is sewn or otherwise attached to the outer cover 24 at the location of the hole 2. The waterproof material 46 could also be attached to the outer cover 24 by Velcro® or other means of closure. This piece of material 46 is larger than the dimensions of the hole 2 so that it is slack within the hole 2. When assembled, the piece of material 46 has enough slack so that it can extend through the cut-out 40 and into the detent 38. See FIG. 4. The material 46 can be made of ProSoft® Premium Fleece Waterproof 1 mil PUL Fabric. Other choices include: Acetate microfleece; ProSoft® Food Safe Waterproof PUL Fabric; Protec Microfleece; ProSoft® Organic Cotton Fleece Waterproof 1 mil PUL Fabric; Zorb® 4D Polyester; Dimple Waterproof PUL Soaker Silver Fabric with SILVADUR™, or other suitable material. Criteria for a suitable material include waterproof quality and pliability.

When in use, a relatively flat warming or cooling unit 42 is placed on top of the piece of material 46 and extends through the cut-out 40 so as to rest on the detent 38. Because of the slack in the piece of material 46, which allows it to be deformed and extend through the cut-out 40 into the detent 38 (see FIG. 4), the element 42 extends through the cut-out 40 into the detent 38 so that the top surface of the unit 42 is substantially flush with the surface 48 (FIGS. 3 and 4) of the outer cover 24, and thus sits between the outer cover 24 and the top coverlet 8. The warming or cooling unit 42 is one which does not have any wires or external connections. The warming or cooling unit 42 could be a hot and cold flexible gel ice pack that can be microwaved to provide warmth, or frozen to provide cold. An ice pack, rice pack, or hot water bottle could also be used. Alternatively, the warming or cooling unit 42 can be battery powered or contain warming/cooling beads. In either event, it is important that the owner not heat the warming or cooling unit 42 to be very hot, as it could injure or burn the pet when they lay on the bed. The size and position of the detent 40, cut-out 38 and the warming or cooling unit 42 can be varied depending on the size of the pet bed. However, the size will preferably cover only a portion of the surface area of the pet bed.

Figure 6:
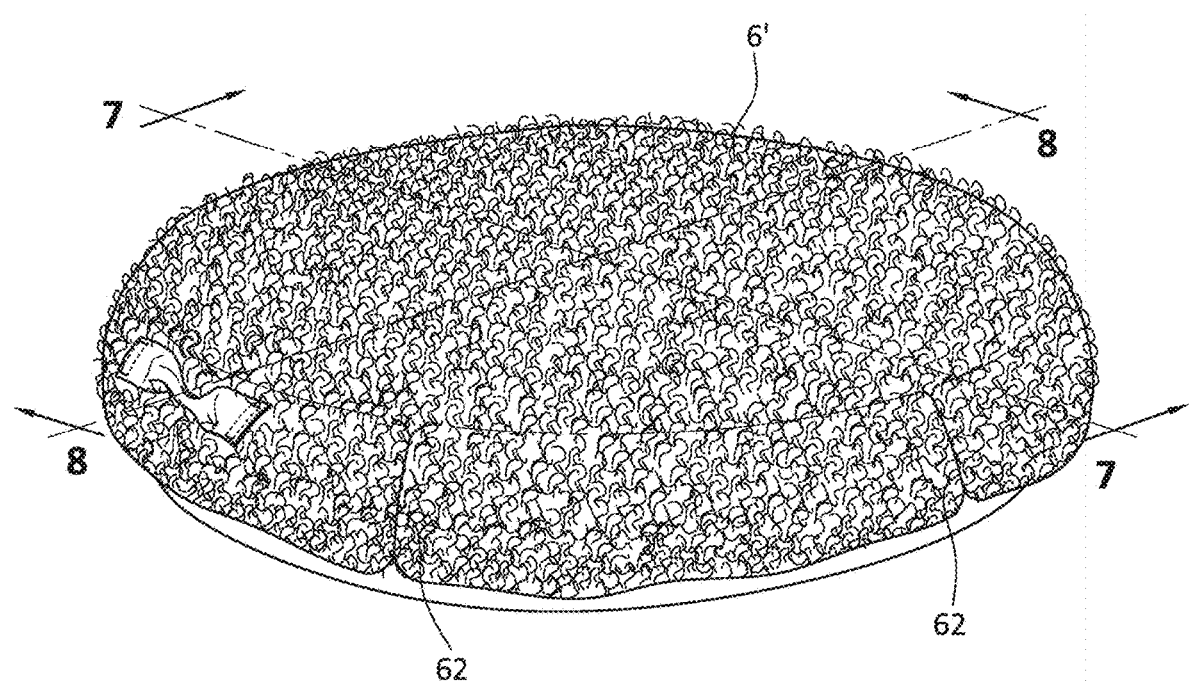
FIG. 6 is a perspective view of a pet bed according to another configuration.
Figure 7:
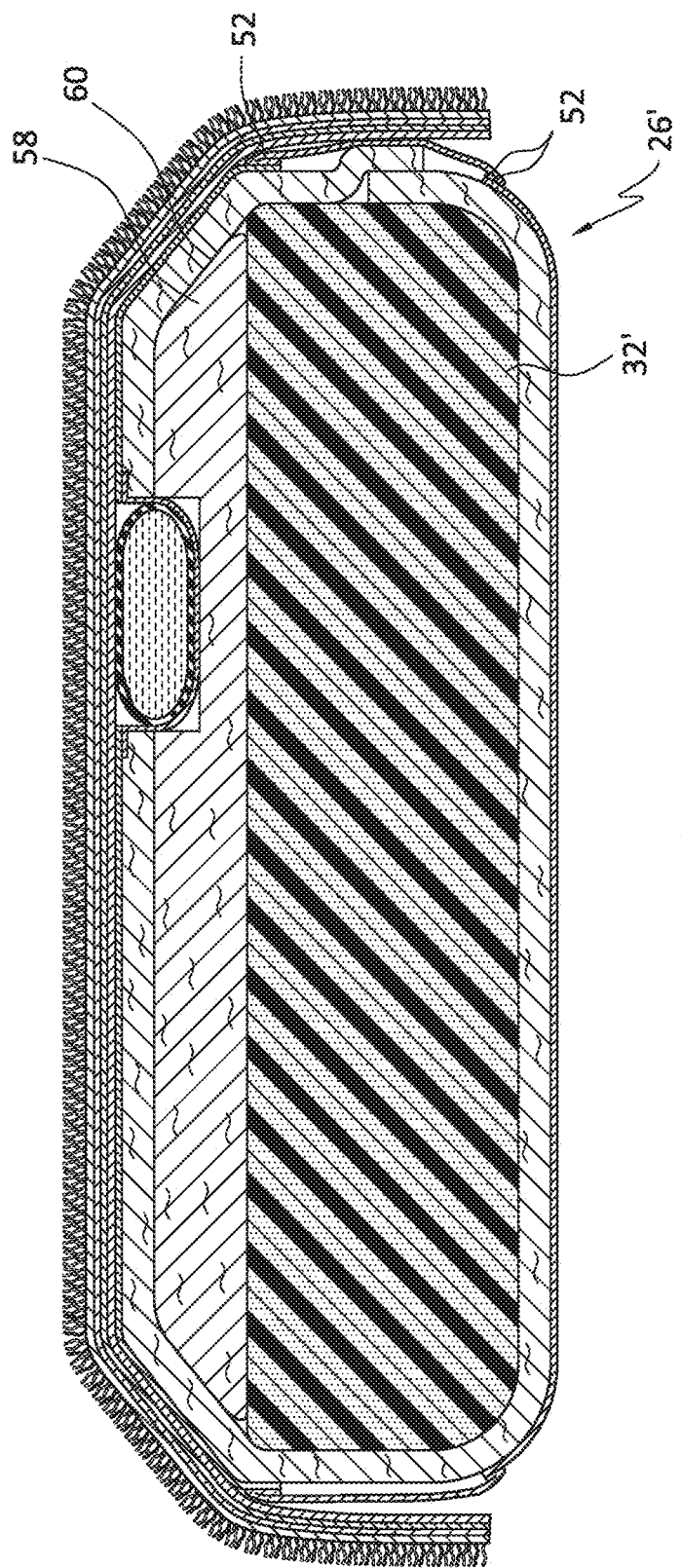
FIG. 7 is a cross-sectional view of the pet bed of FIG. 6 along the line 7-7.
Figure 8:
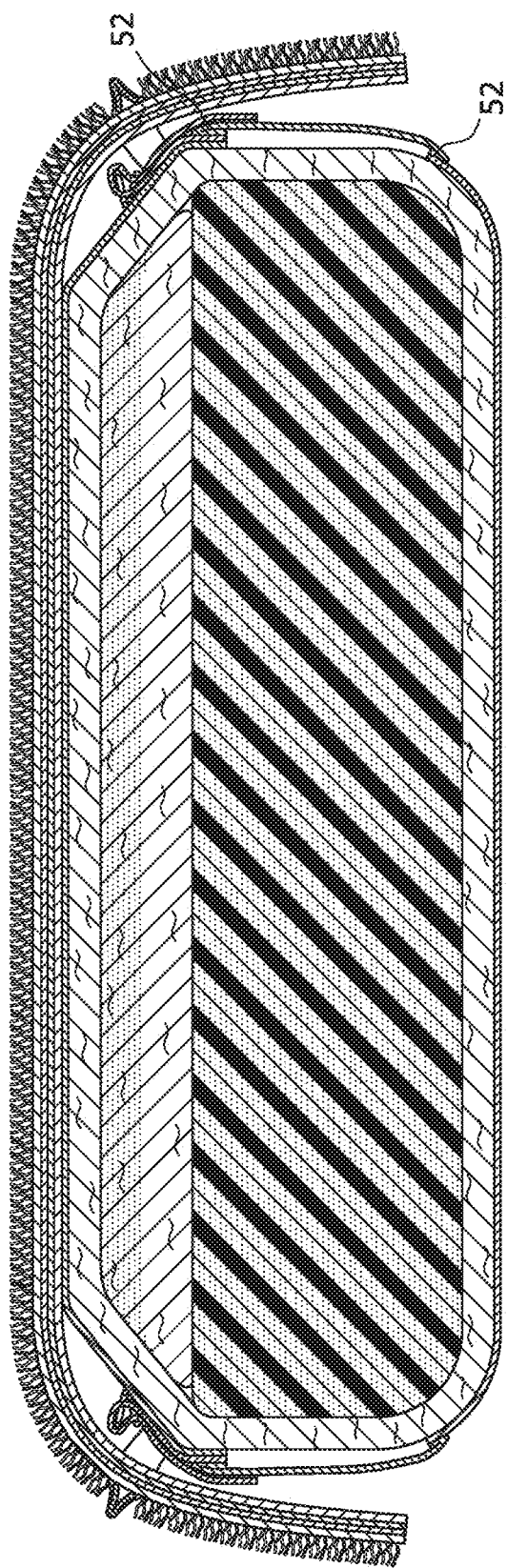
FIG. 8 is a cross-section view of the pet bed of FIG. 6 along the line 8-8.

FIGS. 6-8 illustrate another configuration of the pet bed of the present application. The elements shown in FIGS. 6-8 that are not described below have the same structure and function as those described above with respect to FIGS. 1-5. In this configuration, the shape of the bed is round, instead of rectangular. The shape can also be square, or triangular, or any other suitable shape within the ordinary skill of the artisan. All features that appear in this configuration that are identical to the features in the configuration of FIGS. 1-5 will be shown with identical reference numbers and their descriptions will not be repeated.

The top coverlet 6' may be formed as a single round shaped coverlet. As such, to have it hang down properly over the base mattress, pleats 62 may be formed at various places around the circle. Only two are shown, with one or two others, not shown, on the other side of the pet bed.

Instead of the zipper 28, the outer cover 24 can be sewn shut at the factory along a seam 52 shown in FIG. 7. This feature can also be used in the rectangular configuration.

In this configuration, as shown in FIG. 7, the intermediate layer 58 of the base mattress 26' is provided with slanted or sloped sides 60 that extend around the circumference of the intermediate layer 58. The intermediate layer 58 may be shorter in width than the base layer 32', as shown in FIGS. 7 and 8. The pet's head would then be supported by the slanted sides 60. This slanted configuration can also be used in the rectangular configuration shown in FIGS. 1-6.

Figure 9:
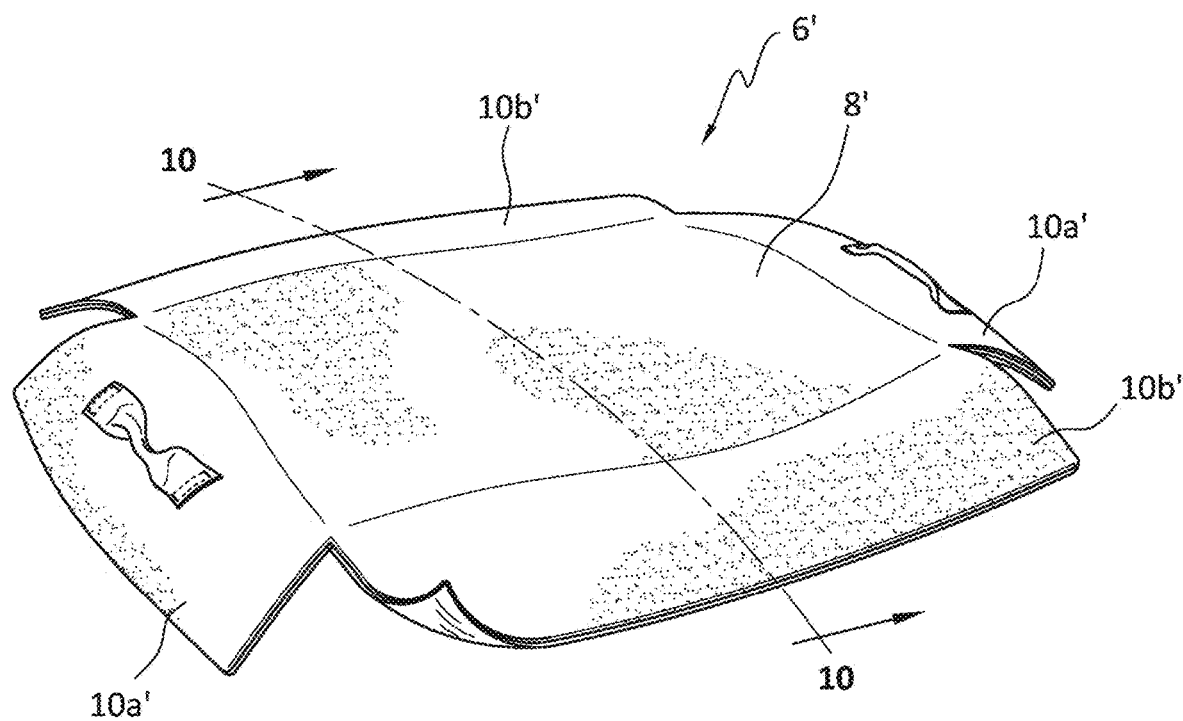
FIG. 9 is a perspective view of a non-reversible top coverlet according to another configuration.
Figure 10:
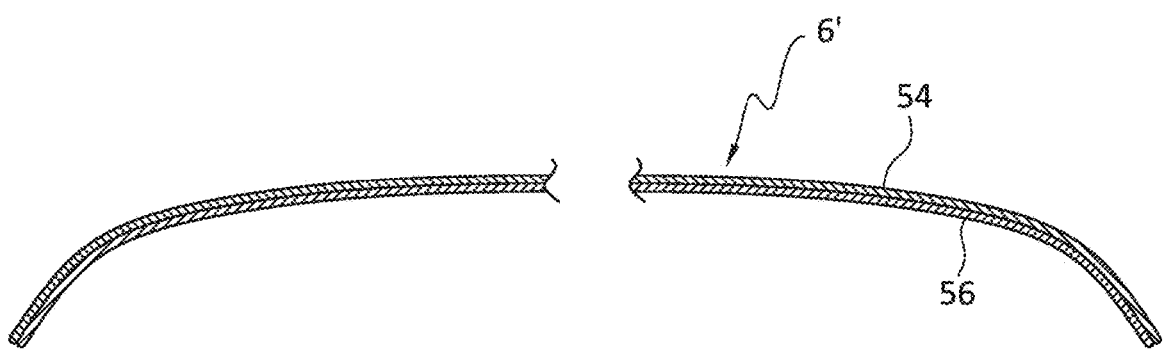
FIG. 10 is a cross-sectional view of the top coverlet of FIG. 9 along line 10-10.

FIGS. 9 and 10 shown another configuration of the top coverlet 6'. In these figures, the top coverlet 6' is not reversible. The top coverlet 6' can be made in one piece as shown in FIG. 10 or can be formed by a central pad 8' with four flaps 10a', 10b' sewn onto the central pad 8' (similarly to the configuration shown in FIG. 1 and FIG. 3 and as shown in FIG. 9). The top layer 54 can be made of a decorative coordinating fabric as described above with respect to the top coverlet 6. The bottom layer 56 can be a waterproof interfacing layer or terry cloth. In this case, the underside (or second layer) of the top coverlet 6' could be dampened, and used for moist soothing warmth. This could be beneficial to help pets with skeletomuscular pain such as osteoarthritis. Alternatively, a hydrocollator pack covered in a terry cloth sleeve used as warming element, as long as it is not heated too high such that it would injure or burn the pet. Other materials that could be used for the bottom layer 56 of the non-reversible top coverlet 6' are Otterex® canvas, Gore-Tex®, e-Vent®, Ripstop®, 2-ply Hydro Shield Mini Ripstop WPB Nylon, ThermoLite®, water repellant Cotton/polyester, 100% nylon waterproof, or 100% polyester.

A kit can be sold comprising the pet bed shown in FIG. 1-5 or 6-8, at least one warming or cooling unit 42, and one or more additional top coverlets 6 or 6'.

To make the pet bed according to the disclosed subject matter, the following exemplary method could be used. The base mattress insert 26 can be made by cutting a first foam cushion into a predetermined shape having a predetermined thickness from top to bottom to form the base layer 32. According to one configuration, the thickness can be approximately 5 inches. The intermediate layer 34 is formed by cutting a second foam cushion into the same general predetermined shape having a predetermined thickness and having two first opposing sides that are shorter in width than a width of the first foam cushion. According to one configuration, the thickness can be approximately between 1-2 inches. A cut-out 40 is cut in the batting layer 36 that extends through the entire thickness of the batting layer to form an opening therein. A detent 38 is cut in the intermediate layer 34 having a size and position corresponding to the size and position of the cut-out 40. The detent 38 does not pass all the way through the entire thickness of the intermediate layer 34. The second foam cushion (intermediate layer 34) is then placed on the first foam cushion (base layer 32).

A predetermined width and length of batting material to form the batting layer 36 is cut in a sufficient size to completely enclose the first and second foam cushions once they are placed one on top of the other. The first and second foam cushions are then covered with the cut batting material such that the batting material slants along the ridge 44, between a top of the second foam cushion and a side of the first foam cushion at the first two opposing sides. Assembling these three layers forms the base mattress insert.

The water repellant outer cover 24 is made of a water repellant material that is shaped and sized to cover the base mattress insert 26. See FIG. 3. The outer cover 24 can be made simultaneously with the base mattress or after the base mattress insert is assembled. Straps 16 have a first end that are sewn or otherwise fixed on an outer surface of two sides of the water repellant outer cover 24. A patch 22 is then sewn or otherwise affixed to the outer surface of the two sides of the outer cover 24 so as to cover the first end of each strap. Each strap 16 may have a hook area 18a sewn or otherwise fixed on the free ends thereof. A loop area 18b may then be sewn or otherwise affixed to the outer surface of the patch 22 at a location approximately corresponding to the end of the strap 16. Two pairs of rings 20a, 20b are fixed to the outer cover 24, the rings within the pair being affixed close to each other, one pair begin disposed on each side of the outer cover 24. Although the hook area 18a is shown affixed to the free end of the straps 16 and the loop area 18b is shown affixed to the patch 22, the hook and loop areas can be reversed. Alternatively, other openable fasteners may be used in place of the hook and loop fastener, such as snaps, buttons, buckles, and the like.

A hole 2 is cut in the top surface of the water repellant outer cover 24. The hole 2 is cut in a position, shape and size corresponding to the position, shape and size of the cut-out 40 and detent 38. A piece of water resistant material 46 is affixed directly to the water repellant outer cover 24 at the location of the hole 2. The piece of water resistant material 46 is sized so as to be larger than the hole 2 and sewn onto the outer cover so as to be slack. The base mattress insert 26 is covered with the water repellant outer cover 24 such that the piece of water resistant material 46 is positioned to cover and extend into the cut-out 40 and the recess 38 when a warming or cooling unit 42 is seated on the piece of water resistant material 46.

The top coverlet 6 can be made according to one configuration, shown in FIGS. 1-5, as follows. A piece of a first fabric forming a top layer 14a and having a first aesthetically pleasing design is cut into a predetermined shape, such as a rectangle or square. A piece of a waterproof interface layer 30 is cut to the same size as the piece of the first waterproof fabric. A piece of a second fabric forming a bottom layer 14b and having a second aesthetically pleasing design (or a solid color) is cut to the same shape and size as the first fabric (top layer 14a) and the waterproof interface layer 30. The piece of the first fabric (top layer 14a), the piece of the waterproof interface layer 30, and the piece of the second fabric (bottom layer 14b) are sewn together to form a center portion 8 of the top coverlet 6. Four flaps 10a, 10b (or only two flaps) are sewn or otherwise affixed to the center pad 8, one flap on each side of the center pad 8. The flaps may be made of the same fabric as the center pad 8 of the coverlet. The four flaps can be made of a third waterproof fabric having a third aesthetically pleasing design or a solid color with no design. The waterproof interface layer 30 may be a bland waterproofed interface such as Ripstop®. The first, second and third aesthetically pleasing designs may be different from one another or may be the same. Alternatively, the top coverlet 6 can be made of a single piece of material cut to fit over the base mattress, as shown in FIGS. 9 and 10. Further, instead of using three layers, only two layers, a top layer 54 of an aesthetically pleasing design can be sewn or otherwise affixed to a bottom waterproof layer 56, forming a non-reversible top coverlet. This two-layered, non-reversible coverlet may have a contrasting color, waterproof fabric on the underside (second waterproof layer) such as Ripstop® or Gore-Tex®.

Although various features of the invention have been described with particular embodiments. It is considered within one of ordinary skill in the art to mix and match the features in other embodiments not depicted in the figures.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A pet bed comprising:
   a base mattress comprising at least a first layer and a second layer, and a water repellant outer covering, wherein a cut-out is defined in the first layer, and a detent is defined in the second layer, the detent having a position and shape corresponding to a position and shape of the cut-out, and wherein the water repellant outer covering surrounds the first layer and the second layer, and comprises a water resistant section sewn into the water repellant outer covering, wherein the water resistant section consists only of a portion of a surface of the water repellant outer covering having a position and shape corresponding to the position and shape of the cut-out; and
   a top coverlet configured to be removably connected to the base mattress to cover a top surface of the base mattress,
   wherein the water resistant section of the water repellant outer covering is sized and positioned so as to extend into the cut-out defined in the first layer and the detent defined in the second layer when the water repellant outer covering is in use and a warming or cooling unit is seated on the water resistant section, such that a top surface of the warming or cooling unit is flush with a top surface of the water repellant outer covering.

2. The pet bed of claim 1, wherein the base mattress comprises a third layer, the base mattress comprising the second layer disposed on the third layer, and the first layer surrounding the second and third layers, and the water repellant outer covering additionally surrounds the third layer.

3. The pet bed of claim 1, further comprising a strap arrangement disposed on an outer surface of each of two sides of the water repellant outer covering.

4. The pet bed of claim 3, wherein the top coverlet comprises:
   a center portion comprising a first fabric having a first surface and a second surface opposite to the first surface, the second surface configured to contact the water repellant outer covering when in use;
   at least two flaps, each connected to a side of the center portion and configured to hang over the water repellant outer covering, each flap having a first surface and a second surface opposite to the first surface.

5. The pet bed of claim 4, further comprising handles on the first and second surfaces of at least two of the at least two flaps disposed so as to engage with the strap arrangement.

6. The pet bed of claim 2, wherein the third layer comprises a relatively stiff foam cushion.

7. The pet bed of claim 2, wherein the second layer comprises a foam cushion, wherein the second layer is shorter in width on two first opposing sides and equal in width on two second opposing sides than the third layer so as to create a ridge along the base mattress on which a pet can rest its head.

8. The pet bed of claim 2, wherein the first layer comprises a batting material sized to completely enclose the second layer and the third layer on four sides.

9. The pet bed of claim 2, wherein the first layer is wrapped around the third layer and has a slanted portion extending between the second layer and the third layer on the two first opposing sides to provide support for the pet's head.

10. The pet bed of claim 1, wherein the water resistant section comprises a material different from a material used to make the water repellant outer covering.

11. The pet bed of claim 4, wherein the center portion of the top coverlet comprises a top layer comprising a first material having a first aesthetically pleasing design, a middle waterproof interface layer, and a bottom layer comprising a second material having a second aesthetically pleasing design.

12. The pet bed of claim 4, wherein the top coverlet is quilted.

13. The pet bed of claim 10, wherein the first aesthetically pleasing material is different than the second aesthetically pleasing material.

14. The pet bed of claim 10, wherein the top coverlet is interchangeable with other top coverlets having different materials forming the top and bottom layers.

15. The pet bed of claim 4, wherein the top coverlet is interchangeable with other top coverlets having different patterns.

16. The pet bed according to claim 5, wherein each of the strap arrangements comprise a strap having a first free end, an intermediate portion, and a second end affixed to a side surface of the outer covering, and a pair of rings affixed to a top surface of the outer covering, the rings in each pair being disposed near to one another, wherein the free end of each strap is configured to be inserted into both rings of the pair of rings, then inserted through a respective handle, folded over one of the rings in the pair, and through a second ring in the pair, and wherein the free end of each strap comprises a first fastener element, a second fastener element is connected to the second end of each strap, and the first fastener element and the second fastener element are configured to engage with one another to secure the strap assembly and thereby secure the top coverlet to the base mattress.

17. The pet bed according to claim 1, wherein the top coverlet comprises a first layer comprising a decorative coordinating fabric and a second layer connected to the first layer comprising a waterproof interfacing layer.

18. A kit comprising:
the pet bed according to claim 1;
at least one warming or cooling unit; and
one or more additional top coverlets having at least one of center portions of different materials and flaps having coordinating fabrics.

19. A method of making a pet bed, comprising:
cutting a first foam cushion into a predetermined shape having a predetermined thickness;
cutting a second foam cushion into the predetermined shape having a predetermined thickness that is thinner than the predetermined thickness of the first foam cushion, and two first opposing sides that are shorter in width than a width of the first foam cushion;
placing the second foam cushion on the first foam cushion;
cutting a width and length of batting material of a sufficient size to completely enclose the first and second foam cushions;
cutting a cut-out in the batting material and a detent in the second foam cushion, the detent having a size and position corresponding to a size and position of the cut-out;
covering the first and second foam cushions with the cut batting material to form a base mattress insert, such that when the first and second foam cushions are covered with the batting material, the batting material slants between a top of the second foam cushion and a side of the first foam cushion at the first two opposing sides;
making a water repellant outer cover of a water-resistant material that is shaped and sized to cover the base mattress insert;
connecting a strap arrangement on an outer surface of two sides of the water repellant outer covering;
cutting a hole in the water repellant outer cover;
connecting a piece of water resistant material directly to the water repellant outer cover, the piece of water resistant material being sized to be slack in the water repellant outer cover;
covering the base mattress insert with a water repellant outer cover such that the piece of water-resistant material is positioned to cover and extend into the recess when a warming or cooling unit is seated on the piece of water-resistant material.

20. The method of claim 19, further comprising forming a top coverlet by:
cutting a first fabric having a first aesthetically pleasing design, the cut first fabric having a desired shape;
cutting a piece of a waterproof interface layer to the same size as the cut first fabric;
cutting a second fabric having a second aesthetically pleasing design, the cut second fabric having the same size as the cut first fabric;
connecting the piece of the first fabric, the piece of the waterproof interface layer, and the piece of the second fabric as three layers, respectively to form a center portion of the top coverlet;
connecting two or more flaps to the center portion, one flap on each side of the center portion, wherein the two or more flaps comprise a third fabric having a third aesthetically pleasing design; and
connecting a handle on each surface of at least two of the two or more flaps.

21. The method of claim 19, further comprising connecting two pairs of rings to the outer cover in close proximity to each other, one pair on each side of the outer cover in a position such that a free end of respective first straps can be inserted through the rings, wherein a ring is inserted on each of the first straps, a first fastener element is connected on a first end of the first straps, and a second fastener element is connected to a second end of the first straps, and wherein the first fastener element and the second fastener element are configured to engage with one another to secure the top coverlet to the base mattress.

22. A pet bed comprising:
a base mattress comprising:
a base layer comprising a foam cushion;
an intermediate layer juxtaposed on the base layer;
a batting layer enclosing the base layer and the intermediate layer;
a cut-out defined in the batting layer passing through an entire thickness of the batting layer;
a detent defined in the intermediate layer extending partway into intermediate layer, the detent having a position and shape corresponding to a position and shape of the cut-out;
a water repellant outer covering surrounding the base layer, the intermediate layer and the batting layer, the water repellant outer covering comprising a water resistant section sewn into the water repellant outer covering, wherein the water resistant section consists only of a portion of a surface of the water repellant outer covering having a position and shape corresponding to the position and shape of the cut-out;
a strap arrangement disposed on an outer surface of each of two sides of the water repellant outer covering; and
a top coverlet comprising:
a center portion comprising a first fabric having a first surface and a second surface opposite to the first surface, the second surface configured to contact the water repellant outer covering when in use;
two or more flaps, each connected to a side of the center portion and configured to hang over the water repellant outer covering, each flap having a first surface and a second surface opposite to the first surface; and
handles on the first and second surfaces of at least two of the two or more flaps disposed so as to engage with the strap arrangement,
wherein the water resistant section of the water repellant outer covering is sized and positioned so as to extend into the cut-out defined in the batting layer and the interfacing layer when the water repellant outer covering is in use and a warming or cooling unit is seated on the water resistant section, such that a top surface of the warming or cooling unit is flush with a top surface of the water repellant outer covering.

* * * * *